(12) United States Patent
Carlson et al.

(10) Patent No.: US 6,823,810 B2
(45) Date of Patent: Nov. 30, 2004

(54) WIRELESS BALLAST WATER MONITORING AND REPORTING SYSTEM AND MARINE VOYAGE DATA RECORDER SYSTEM

(75) Inventors: Robert F. Carlson, Brookline, MA (US); Thomas J. Baldasarre, Mansfield, MA (US); Kushal K. Talukdar, Wayland, MA (US)

(73) Assignee: Harris Acoustic Products Corporation, E. Walpole, MA (US)

( * ) Notice: Subject to any disclaimer, the term of this patent is extended or adjusted under 35 U.S.C. 154(b) by 0 days.

(21) Appl. No.: 10/365,959

(22) Filed: Feb. 13, 2003

(65) Prior Publication Data

US 2003/0205187 A1 Nov. 6, 2003

Related U.S. Application Data

(60) Provisional application No. 60/376,955, filed on May 1, 2002.

(51) Int. Cl.[7] .............................................. B63B 39/03
(52) U.S. Cl. ........................................ 114/125; 701/21
(58) Field of Search ................................ 114/121, 122, 114/125; 340/984; 701/21

(56) References Cited

U.S. PATENT DOCUMENTS

| | | | |
|---|---|---|---|
| 3,971,084 A | * | 7/1976 | Spier ........................... 114/357 |
| 3,978,469 A | * | 8/1976 | Schaad et al. .......... 340/310.05 |
| 4,213,199 A | | 7/1980 | Labaw et al. |
| 4,549,267 A | * | 10/1985 | Drabouski, Jr. .............. 701/124 |
| 4,872,118 A | * | 10/1989 | Naidenov et al. ........... 701/124 |
| 5,001,485 A | * | 3/1991 | Jones ........................... 342/13 |
| 5,159,580 A | | 10/1992 | Andersen et al. |
| 5,437,058 A | * | 7/1995 | Grosz et al. ................ 455/41.1 |
| 5,587,707 A | * | 12/1996 | Dickie et al. ........... 340/870.09 |
| 6,432,304 B1 | * | 8/2002 | Nguyen ...................... 210/172 |
| 6,492,898 B1 | * | 12/2002 | Sabbattini et al. ...... 340/310.01 |

* cited by examiner

*Primary Examiner*—Andrew Wright
(74) *Attorney, Agent, or Firm*—Pandiscio & Pandiscio; Scott R. Foster

(57) ABSTRACT

A ballast water monitoring and reporting system for seagoing vessels includes a sensor for monitoring a selected parameter of a ballast water system component and transmitting an electronic signal indicative of a condition of the parameter, a distal acoustic modem for receiving the signal from the sensor and for transmitting an acoustic signal equivalent to the electronic signal received, a shipboard metal structure extending substantially throughout the vessel and adapted to carry the acoustic signal, a proximal acoustic modem adapted to receive the acoustic signal from the metal structure and to transmit an electronic equivalent thereof, and a shipboard data acquisition computer adapted to receive the electronic signal from the proximal acoustic modem and to generate at least one of a display, a report relative to the selected parameter, and a recording of data relative to the selected parameter.

15 Claims, 3 Drawing Sheets

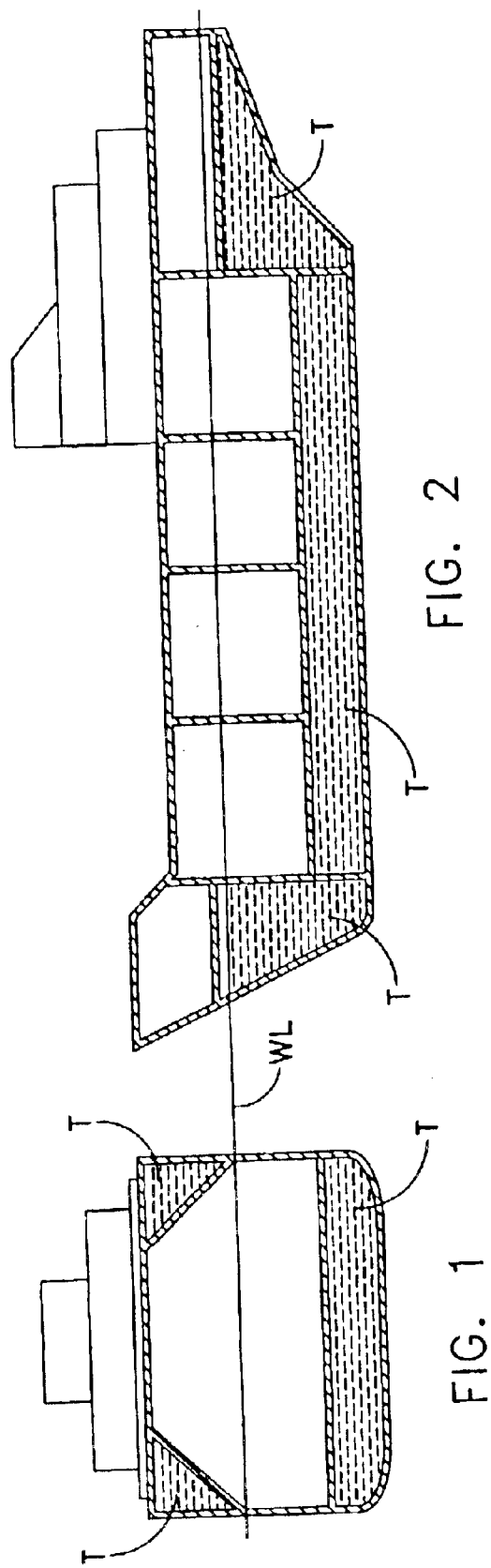

WIRELESS BALLAST WATER MONITORING AND REPORTING SYSTEM AND MARINE VOYAGE DATA RECORDER SYSTEM

CROSS-REFERENCE TO RELATED APPLICATION

This application claims the benefit of U.S. Provisional Patent Application Ser. No. 60/376,955, filed May 1, 2002 in the names of Robert F. Carlson, Thomas J. Baldasarre, and Kushal K. Talukdar.

BACKGROUND OF THE INVENTION

1. Field of the Invention

The invention relates to remote monitoring systems and is directed more particularly to a ballast water exchange monitoring and reporting system, to a substantially wireless monitoring and reporting system, and to a marine voyage data recorder system.

2. Description of the Prior Art

While the increase of sea borne commerce over the last century has contributed significantly to the economic development of almost all nations, it has also increased the vulnerability of native echosystems, as well as local economies, and public health associated with them. The threats come from the release of "Non-Indigenous Species" into the marine environments from ballast water discharge of ships during loading of cargoes at various ports.

Normally ships sail at a designated gross tonnage to reduce stress on their hulls, and maintain safe stability and maneuverability. However, the tonnage reduces when cargo is unloaded or as water and fuel is consumed during a voyage. Ballast water is taken in when cargo is unloaded or fuel tanks are emptied, to maintain acceptable tonnage. Ballast water is thus essential for the safe operation of ships. As cargo and fuel are loaded in the next port of call, the ballast water taken in earlier is discharged. Unfortunately, during the discharge various marine micro-organisms taken in during ballast loading are discharged into a new environment and can pose numerous threats.

There are a number of examples of such threats, including the introduction of North Pacific Seastar (*Asterias amurentis*) in Australia from ballast water taken in Japan. This predatory species poses a threat to the local commercial shellfish industry. Another example is the presence of the European Zebra Mussel, (*Dreisseina polymorpha*) in the United States. Introduced in the Great Lakes in the 1980s, it is currently detected in 40% of inland United States waterways, fouling water intake pipes, and has cost over $5 billion (estimated) in associated cleanups since 1989. Further, ballast water can be a potential bio hazard as demonstrated by the discovery of the cholera bacterium in the oysters and shellfish of Mobile, Ala., brought by ballast water exchange during the South American cholera epidemic in 1991.

Recognizing the risks, the United States Congress has passed the National Invasive Species Act of 1996 (NISA) which requires ships entering United States waters from outside the Exclusive Economic Zone (EEZ) to report ballast water management practices.

There are recognized methods to reduce threats from Aquatic Nuisance Species, including:
1. Isolation, which involves discharging the ballast water into special reception facilities, or returning the water to its original location.
2. Treatment, which involves treating the water properly before discharging the water. Treatment options are mechanical (e.g. filtration), physical (e.g. thermal, ultraviolet, etc.) and chemical (e.g. use of various disinfectants or organic biocides).
3. Exchange, which involves flushing of the ballast tanks in deep water.

Of the above three methods, only ballast water exchange is economical at present and is the focus of the United States Coast Guard which has instituted a voluntary program for ballast water management based on ballast water exchange and reporting for vessels coming from outside the EEZ. The program may become mandatory in the future.

Ballast water can be carried either in dedicated ballast tanks or in specially designed cargo holds. Some typical locations of ballast tanks T are shown in FIGS. 1 and 2, wherein WL indicates the water line of a fully loaded vessel.

As seen in FIGS. 1 and 2, the ballast tanks can be located in different parts of the ship, depending upon the design of the specific class of ships. The primary purpose of the ballast tanks is to provide stability in all possible cargo loading combinations when the vessel is underway or is loading or discharging cargo at ports. To support this need, a ballast piping system, consisting of ballast pumps and distribution piping and valves, interconnects the ballast tanks. For the ballast water exchange program, the Coast Guard recommends two exchange methods, namely "empty-refill" method and "flow-through" method. In the empty-refill method, a ballast tank is emptied first and then filled with ocean water. In the flow-through method, discharge and pumping of water is executed simultaneously in a ballast tank and the process is considered complete after a three-tank volume of water is discharged. Of the two methods, generally the "empty-refill" method is more risky for ship's stability, but the master of the vessel has the final authority on how to conduct ballast exchange.

To ensure compliance with NISA, the United States Coast Guard has introduced mandatory ballast water reporting for all vessels entering the EEZ, although the overall ballast water management program remains voluntary. Vessels are asked to perform voluntary mid-ocean ballast exchange and report it when they enter the next port. The reporting form requires a history of ballast tank activities, such as where the tanks were filled and how much, where in the ocean the exchange took place, the water temperature, etc. There is also a provision requiring a statement as to the reason if an exchange was not performed. The reports are sent to the National Ballast Information Clearinghouse (NBIC), a collaborative data management and analysis center, run by the United States Coast Guard and the Smithsonian Environmental Research Center. Over the first twelve months (Jul. 1, 1999, to Jun. 30, 2000) of the rule, compliance with reporting was only 20.8%, as per NBIC interim report. As it stands now, even when reports are provided, the authenticity of the geographical location where the exchange has taken place cannot be verified.

It is clear that an automated system is needed which will be able to produce the ballast water exchange reports more comprehensively and accurately with automatic integration of navigation. Some general requirements that the ballast water exchange monitoring system should be able to satisfy are:
1. The system should be scaleable and be able to integrate into the most basic ships, and to high-end vessels.
2. The system must be easy to install and operate.
3. The system should be versatile and be capable of providing other information that may be needed, such as water temperature or salinity in ballast tanks.

SUMMARY OF THE INVENTION

An object of the invention is, therefore, to provide a ballast water monitoring and reporting system which is adaptable to virtually all vessels, large and small, is relatively inexpensive and easy to install and operate, and which is capable of providing and recording other information, such as the status of hull integrity, fire doors, watertight doors, and the like, and which can be coordinated with navigational position systems to provide a record of locations of events detected and recorded.

A further object of the invention is to provide for the automatic generation of accurate ballast water reports acceptable to the United States Coast Guard and similar governmental agencies of other countries.

A still further object of the invention is to provide a wireless system for monitoring conditions in large structures having a metal structural component extending substantially throughout the structure, the system being operable to monitor conditions in sea-going vessels, as noted above, but also being operable to monitor other structures, such as buildings, bridges, cranes, aircraft, and the like.

With the above and other objects in view, a feature of the present invention is the provision of a ballast water monitoring and reporting system for seagoing vessels. The system includes a sensor for monitoring a selected parameter of a ballast water system component and for transmitting an electronic signal indicative of a condition of the selected parameter, a distal acoustic modem for receiving the signal from the sensor and for creating and transmitting an acoustic signal equivalent to the electronic signal received, a shipboard metal structure extending substantially throughout the vessel and adapted to carry the acoustic signal, a proximal acoustic modem adapted to receive from the metal structure the acoustic signal created and transmitted by the distal acoustic modem, and to transmit an electronic equivalent thereof, and a shipboard data acquisition computer adapted to receive the electronic signal from the proximal acoustic modem and to generate at least one of a display, a report relative to the selected parameter, and a recording of data relative to the selected parameter.

In accordance with a further feature of the invention, there is provided a system as described immediately above wherein the data acquisition computer is adapted to receive inputs from a position system unit and to include data therefrom in the display, paper report, and recording.

In accordance with a still further feature of the invention, there is provided a marine voyage data recorder system for seagoing vessels. The system includes sensors disposed on the vessel in selected locations for monitoring selected parameters and for transmitting electronic signals indicative of conditions of the selected parameters, distal acoustic modems for receiving the signals from the sensors and for transmitting acoustic signals equivalent to the electronic signals received, a shipboard metal structure extending substantially throughout the vessel and adapted to carry the acoustic signals, a proximal acoustic modem adapted to receive the acoustic signals from the metal structure and to transmit electronic equivalents thereof, and a voyage data recorder adapted to receive electronic signals from the proximal acoustic modem and to record data carried by the electronic signals from the second acoustic modem.

In accordance with a still further feature of the invention, there is provided in the system described immediately above a navigation position system unit, and the voyage data recorder is adapted to receive inputs from the position system unit and to record the data therefrom in conjunction with recordal of the data from the proximal acoustic modem.

In accordance with a still further feature of the invention, there is provided a substantially wireless monitoring and reporting system for structures having a metal structural component extending substantially throughout the structure. The system includes a sensor for monitoring a selected parameter in a selected location in the structure and for transmitting an electronic signal indicative of a condition of the selected parameter in the selected location, a distal acoustic modem for receiving the signal from the sensor and for transmitting an acoustic signal equivalent to the electronic signal received, to the metal structural component and through the metal structural component, a proximal acoustic modem adapted to receive the acoustic signal transmitted through the metal structural component and to transmit an electronic equivalent thereof, and a data acquisition computer adapted to receive the electronic signal from the proximal acoustic modem and to generate at least one of a display, a paper report relative to the selected parameter, and a recording of data relative to the selected parameter.

The above and other features of the invention, including various novel details of construction and combinations of parts, will now be more particularly described with reference to the accompanying drawings and pointed out in the claims. It will be understood that the particular system embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 1 is a diagrammatic athwartships sectional view of a seagoing vessel, showing common dispositions of ballast water tanks;

FIG. 2 is a diagrammatic fore-and-aft sectional view of a seagoing vessel showing common dispositions of ballast water tanks;

DESCRIPTION OF THE PREFERRED EMBODIMENTS

Figure 3:
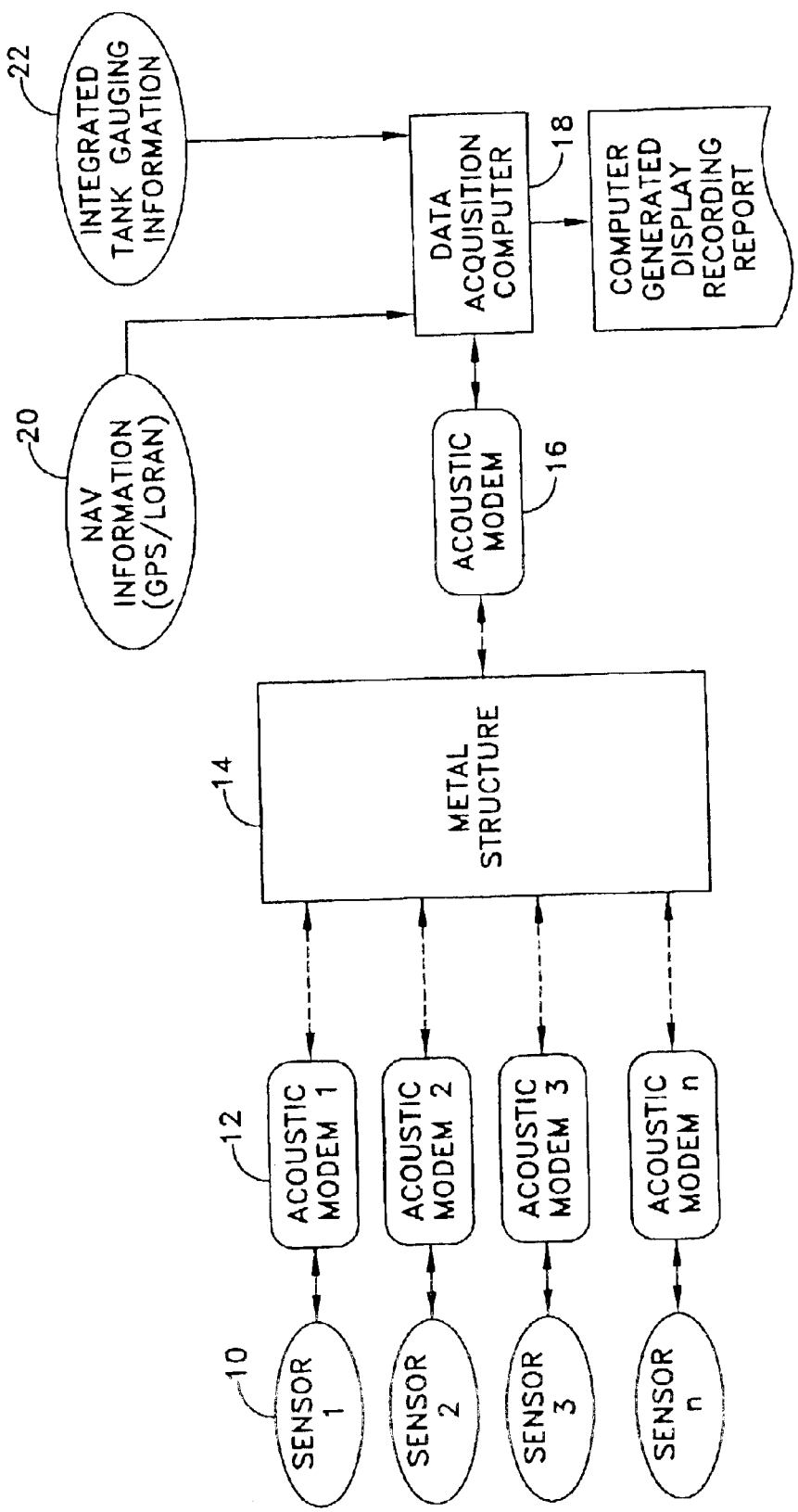
FIG. 3 is a block diagram of one form of ballast water monitoring and reporting system illustrative of an embodiment of the invention.

Referring to FIG. 3, it will be seen that an illustrative system for monitoring and recording ballast water exchange includes sensors 10. Such sensors typically include tank level sensors and/or flow meters and/or ballast pump switch sensors, but may further include sensors for salinity, temperature, dissolved oxygen, pH measurement, chlorine measurement, and other such sensors, and the like.

Each of the sensors 10 is disposed in a ballast water system component, such as a ballast water tank, a ballast water flow conduit, a ballast water pump or pump switch, or the like, and is in electrical communication, analog or digital, with a distal acoustic modem 12.

The distal acoustic modems 12 are known in the art and serve to convert an electronic signal to an acoustic signal. The distal acoustic modems 12 may be powered by the vessel's power system but, in addition, have an internal battery to maintain the system in the event of a ship's power disruption. In some applications, ship's power is not available, particularly at remote locations, and the acoustic modems depend entirely upon their own power supply.

Each of the distal acoustic modems 12 is in acoustic communication with a metal structure 14 which extends substantially throughout the vessel and is adapted to carry an acoustic signal. The aforesaid metal structure 14 typically is the ship's hull, but may be metal railings, beams, decks, or the like, in place of, or in addition to, the ship's hull. The distal acoustic modems 12 transmit the acoustic signal, along with an identifier for the transmitting distal modem, to the metal structure 14.

Figure 4:
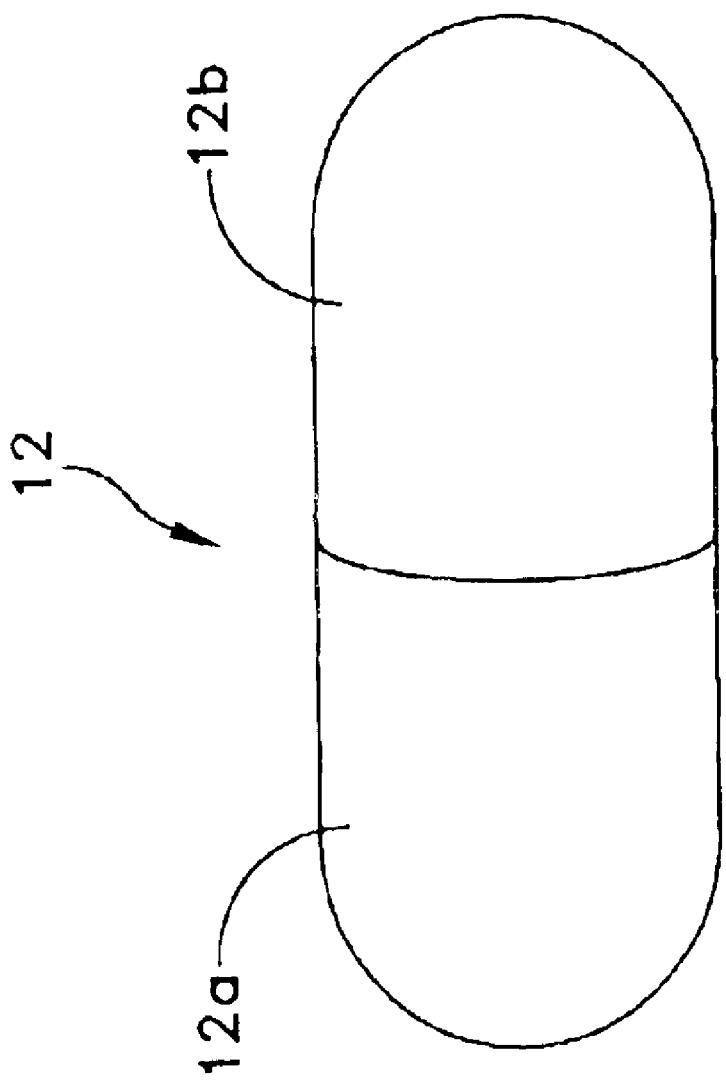
FIG. 4 is a diagrammatic illustration of acoustic modem components of the system of FIG. 3.

Each acoustic modem 12 comprises an electronics box 12a (FIG. 4) capable of receiving and sending information from and to a sensor 10, store the information received from the sensor, attach an identifier to a message from the sensor, create electronic signals equivalent to the message received from the sensor and provide the signals to an acoustic transducer 12b. The electronics box 12a is also capable of receiving signals from the acoustic transducer 12b. The acoustic transducer 12b receives the electronic signals from the electronic box 12a and converts the electronic signals to acoustic vibrations that are transmitted into the hull or other metal structure 14. The acoustic transducers 12b also may receive acoustic signals from the hull, convert such signals into an electronic form, and send the electronic signals to the electronics box 12a. The acoustic transducers 12b may be attached to the hull by screwing to holes drilled in the hull, or by clamping to a suitable section of the hull, or by any other suitable means which enables transmission of the acoustic vibrations generated by the transducer 12b into the hull.

A proximal acoustic modem 16 receives the acoustic signals from the metal structure 14 and converts the acoustic signals to electronic signals which the proximal modem 16 sends to a data acquisition computer 18, typically located on the flying bridge of the vessel.

The data acquisition computer 18 is adapted to generate one or all of (i) a data display, (ii) a paper report showing a compilation of data, and (iii) a recording of the data received.

In operation, the sensors 10 monitor the components for which they are configured, as for example, level of ballast water in the vessel's ballast tanks. The data detected by the sensors 10 is electronically passed on to the distal acoustic modems 12, which convert the data to acoustic form and impart acoustic signals, along with identifiers for the distal acoustic modems, to the metal structure 14. In practice, the distal modems 12 send sound pulses at selected intervals, such as pulses of about 20–200 kHz for about one second at intervals of a selected fraction of a second.

The system is adapted to function in reverse, as by initiating an inquiry at the computer 18. The inquiry is electronically directed to a proximal acoustic modem 16 which, in turn, directs the signal acoustically to the metal structure 14 through which the signal is carried to the distal acoustic modems 12, which convert the acoustic signal to the electronic signal sent to the sensors 10, to activate the sensors 10 which provide data back through the system to the computer 18.

The acoustic modems 12, 16 are adapted to use virtually any selected coding scheme, such as Frequency Shift Keying, Phase Shift Keying, Constant False Alarm Rate, or different spread spectrum techniques.

Inasmuch as a plurality of the distal acoustic modems 12 may be in use simultaneously, and all may use the same acoustic path, such as a ship's hull, the distal modems 12 can be programmed to send any number of repetitions of the messages, to improve the chances of the messages being heard at the receiving acoustic modem, and can use different types of time periods, such as linear increment, logarithmic increment, and others that are different for each acoustic modem, between the repetitions to avoid the problem of more than one message arriving at an instant of time.

The system is substantially wireless, in that the sensors 10 and distal modems 12 can be physically interconnected, and the proximal modem 16 and computer 18 can be physically interconnected. The usual extensive electrical wiring for shipboard systems is obviated by using the structure of the vessel itself as an acoustic transmission line with only the inputs thereto and outputs therefrom being of an electrical nature.

Preferably, the system includes a navigation position system unit 20, such as a Global Positioning Unit (GPS), or a Loran unit, or any suitable positioning system, which provides the vessel's position at any time to the computer 18. Most seagoing vessels are provided with one or both of such units. This additional input provides location data contemporary with the activity and status data provided by the sensors 10.

In some high-end vessels, typically large and modern vessels, there exists a tank gauging system 22, which provides data to the bridge as to the level of liquids in various tanks. If a vessel is provided with such a system, the data supplied thereby may be supplied to the data acquisition computer 18 and used in combination with, or in place of, tank level sensors, and the like, described above with respect to the present system.

The data acquisition computer 18 may serve as a marine voyage data recorder, similar to an aircraft "black box". In this configuration, the computer 18 is provided with a recording facility and the sensors are placed to monitor hull stress, hull openings status, watertight door status, fire doors status, fire alarm status, and the like.

The wireless feature of the above-described system facilitates the mounting of a relatively inexpensive system for data acquisition, a system which is easily installed without any major renovations to the vessel.

The acquisition of data relative to ballast water exchange and the automatic production of a record thereof in conjunction with indications of time and place of production of such data, provides the vessel with a ballast water exchange report which may be filed at the next port of call. Aside from the United States, Australia, Canada, Chile, New Zealand and Israel have already introduced regulations that prevent ships arriving at their ports from discharging ballast water containing non-native harmful life forms. The ships' captains are expected to show they have taken measures to prevent such discharges. The system described herein reduces by far the need for paperwork and inspections, and improves the accuracy and credibility of water ballast exchange reports.

While the above-described system is designed primarily for seagoing vessels, and is expected to find wide utility in that area, it is recognized that the system shown in FIG. 3 is readily adaptable to other structures. For example, the system may be used in buildings having metal skeletal structures of columns and beams, to provide data on the status of various doors, windows, closets, furnaces, HVAC systems, and the like. The system may be used on aircraft, bridges, construction cranes, and other metallic structures. As in seagoing vessels, the system can be installed in a substantially wireless manner at relatively little cost. The data acquisition computer can be located in a selected security office, chief operator's office, or driver's or pilot's station. The system functions when power is lost.

It will be understood that many additional changes in the details and arrangement of parts, which have been herein described and illustrated in order to explain the nature of the invention, may be made by those skilled in the art within the principles and scope of the invention as expressed in the appended claims.

What is claimed is:

1. A ballast water exchange monitoring, recordation, and reporting system for seagoing vessels, the system comprising:
   a sensor for monitoring ballast water exchanges of a ballast water tank and for transmitting an electronic signal indicative of the exchange in the ballast water tank;
   a distal acoustic modem for receiving the signal from the sensor and for creating and transmitting an acoustic signal through a shipboard metal structure extending substantially throughout the vessel,
   a proximal acoustic modem adapted to receive from said metal structure the acoustic signal created and transmitted by said distal acoustic modem and to transmit an electronic equivalent thereof; and
   a shipboard data acquisition computer adapted to receive the electronic signal from the proximal acoustic modem and to generate recording of data relative to ballast water exchange activity for a selected length of time, the recording being suitable for ballast exchange reporting requirements.

2. The system in accordance with claim 1 wherein said data acquisition computer is adapted to receive inputs from a position system unit and to include data therefrom in the recording, whereby to include in the report locations and times of ballast water exchange activity.

3. The system in accordance with claim 1 wherein said sensor is further adapted to monitor at least one of water salinity, water temperature, dissolved oxygen content, water pH, and water chlorine content.

4. The system in accordance with claim 1 wherein said shipboard metal structure comprises at least one of the vessel hull, railings, beams, and decks.

5. The system in accordance with claim 2 wherein the position system unit comprises a selected one of a Global Positioning System unit and a Loran System unit.

6. The system in accordance with claim 1 wherein said distal acoustic modem transmits acoustic signals by sending sound pulses of about 20–200 kHz for about one second at intervals of a selected fraction of a second.

7. The system in accordance with claim 1 wherein said proximal acoustic modem is adapted to send an acoustic signal equivalent to a message generated by said data acquisition computer through said metal structure to said distal acoustic modem, and said distal acoustic modem is adapted to activate said sensor.

8. The system in accordance with claim 1 and further comprising additional sensors and distal acoustic modems for monitoring additional ballast water tanks and transmitting electronic signals indicative of, ballast water exchanges wherein each of said distal acoustic modems transmits an identifier for the transmitting distal acoustic modem.

9. A ballast water exchange monitoring, recording, and reporting system for seagoing vessels, the system comprising:
   sensors disposed in ballast tanks for detecting ballast tank exchanges;
   a distal acoustic modem in combination with each of said sensors for converting an electrical communication from the respective sensor to an acoustic signal, said distal acoustic modem being adapted to send the acoustic signal through a metal structural component of the vessel;
   proximal acoustic modems each for receiving the acoustic signal from an associated one of the distal acoustic modems and adapted to convert the acoustic signal transmitted through the vessel metal component to an electrical signal;
   a vessel navigation position unit for providing information as to the location of the vessel at the time of a ballast exchange;
   and a data acquisition computer adapted to receive inputs from said proximal acoustic modems, and said vessel positioning unit, and to record ballast tank exchanges and the location and time of such exchanges, and upon demand, provide a report of ballast tank exchanges, along with location and time of same.

10. The system in accordance with claim 9 wherein said distal acoustic modems are each provided with an internal battery.

11. The system in accordance with claim 9 wherein each of said distal acoustic modems comprises an electronics portion and a transducer portion, said electronics portion being adapted to communicate electronically with at least one of said sensors, to store information received from the at least one sensor, attach an identifier to a message from the at least one sensor, and communicate with said transducer portion, said transducer portion being adapted to convert the electrical communication from said electronics portion to acoustic signals and to send the acoustic signals through the vessel metal structural component to one of said proximal acoustic modems.

12. The system in accordance with claim 11 wherein said distal modems are adapted to send each of the acoustic signals a selected number of times.

13. The system in accordance with claim 11 wherein at least one of said sensors and one of said distal modems are physically interconnected.

14. The system, in accordance with claim 11 wherein at least one of said proximal modems and said computer are physically interconnected.

15. The system in accordance with claim 9 wherein said vessel navigation position unit comprises at least one of Loran and Global Positioning Unit.

* * * * *